United States Patent
Jordan et al.

(10) Patent No.: US 11,293,519 B1
(45) Date of Patent: Apr. 5, 2022

(54) LANYARD ASSEMBLY FOR WIRE-PULLING OR WIRE-ANCHORING PURPOSES

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 417 days.

(21) Appl. No.: 16/501,229

(22) Filed: Mar. 8, 2019

Related U.S. Application Data

(63) Continuation-in-part of application No. 15/998,110, filed on Jul. 2, 2018, now abandoned, which is a continuation-in-part of application No. 14/120,130, filed on Apr. 28, 2014, now Pat. No. 10,027,097.

(51) Int. Cl.
 *F16G 11/02* (2006.01)
 *H02G 1/08* (2006.01)
 *H01R 4/18* (2006.01)
 *G02B 6/44* (2006.01)

(52) U.S. Cl.
 CPC ............ *F16G 11/02* (2013.01); *H02G 1/081* (2013.01); *G02B 6/4465* (2013.01); *H01R 4/188* (2013.01)

(58) Field of Classification Search
 CPC ...... B65H 57/16; B65H 55/005; B65H 54/00; H02G 1/081; F16G 11/02; G02B 6/4465; H01R 4/188
 See application file for complete search history.

(56) References Cited

U.S. PATENT DOCUMENTS

| | | | |
|---|---|---|---|
| 8,844,905 B2 * | 9/2014 | Carlson | B65H 54/00 254/134.3 R |
| 2008/0289874 A1 * | 11/2008 | Good | H01R 4/184 174/84 C |
| 2011/0101290 A1 * | 5/2011 | Carlson | B65H 55/005 254/134.3 FT |
| 2014/0235111 A1 * | 8/2014 | Duncan | H01R 4/56 439/801 |

OTHER PUBLICATIONS

Single-Use Wire Grabber™ from RectorSeal® Published on Jan. 2, 2013 athttps://www.youtube.com/watch?v=2NWGhJlvTXY (Year: 2013).*

* cited by examiner

*Primary Examiner* — Mahdi H Nejad
(74) *Attorney, Agent, or Firm* — Michael E. McKee

(57) ABSTRACT

A wire-anchoring system for use with a core about which a wire is desired to be wound utilizes a lanyard assembly which includes a cord portion and a connector body connected to the cord portion. The elongated connector body has two opposite ends and a hollow interior including an opening which opens out of the body at one end thereof and into which the terminal end of the wire can be inserted for purposes of anchoring the wire to the connector body. In addition, the cord portion of the wire has a free end which is securable to the outer surface of the core adjacent the securement location thereon so that by securing the free end of the cord portion to the outer surface of the core and anchoring the terminal end of the wire to the connector body, the wire is anchored to the core for an operation involving the winding of the wire about the core.

21 Claims, 8 Drawing Sheets

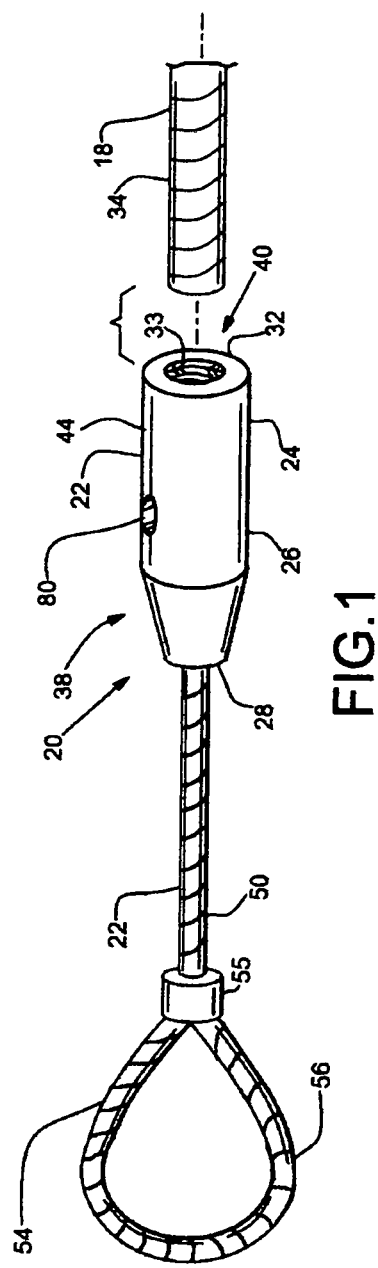
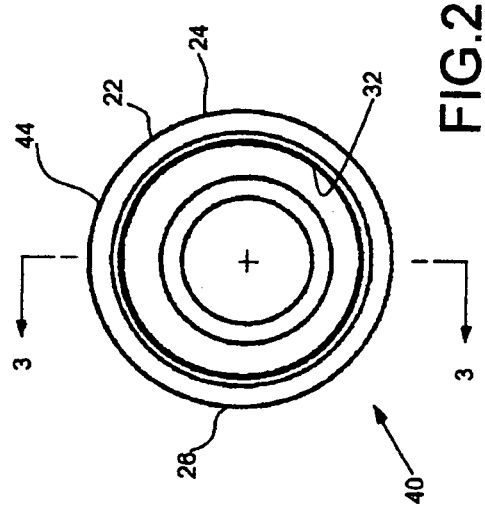

LANYARD ASSEMBLY FOR WIRE-PULLING OR WIRE-ANCHORING PURPOSES

This application is a continuation-in-part application of application Ser. No. 15/998,110, filed Jul. 2, 2018 and entitled CRIMP-ON SINGLE-USE LANYARD ASSEMBLY FOR WIRE-PULLING PURPOSES, which, in turn, is a continuation-in-part application of application Ser. No. 14/120,130, filed Apr. 28, 2014 and entitled CRIMP-ON SINGLE-USE LANYARD ASSEMBLY FOR WIRE-PULLING PURPOSES. The disclosure of these referenced applications is incorporated herein by reference.

BACKGROUND OF THE INVENTION

This invention relates generally to means and methods for pulling wire between two sites and relates, more particularly, to a lanyard assembly which is capable of being secured about one end of a wire for wire-pulling purposes and the means and methods by which a wire is secured about an item utilizing a core for holding a windable material wound therebout.

The class of lanyard assemblies with which this invention is to be compared includes those having a cord portion to which a pulling device can be connected and a wire-accepting connector which is joined to the cord portion. The connector has a body which is elongated in shape and has an opening formed in one end of the body for accepting one end of a wire to be pulled. Once an end of the wire is positioned within the connector body, the connector body is secured, as by way of a crimping or swaging process, about the wire end to secure the connector body to the wire end. The connector body, with the wire end crimped therein, can thereafter be pulled upon, by way of the cord portion, to pull the wire in an endwise, or longitudinal, direction.

Unless the inserted wire end is fully accepted by the connector body when the connector body is crimped thereabout, the surface area of the wire being crimped, or mashed between, the crimped connector body may not be maximized which could, in turn, reduce the wire-pulling capacity of the lanyard assembly. However, the construction of the connector bodies of conventional lanyard assemblies renders it difficult to readily determine whether a wire end is fully accepted by the connector body before the connector body is crimped about the wire end.

It would be desirable to provide a lanyard assembly which enables a user to readily determine whether or not an end of a wire to be pulled is fully or near fully-accepted by the body of the connector before the wire is crimped about the accepted wire end. It would also be desirable to provide a lanyard assembly whose features improve the wire-pulling capacity of the lanyard assembly, once the connector body is crimped about a wire end.

In addition and as it relates to reels, spools and drums having a core about which one or more wires or cables can be wound and from which the one or more wires or cables can be unwound, it is common that an end of each wire or cable be initially anchored directly to the core for purposes of winding the wire or cable about the core. It would be desirable to provide componentry disposed intermediate of the surface of the core and the end of the wire or cable to be anchored to the core to facilitate the anchoring of the wire or cable to the core for a material winding process and to facilitate the subsequent detachment of the wire or cable from the core during a material unwinding process.

Accordingly, it is an object of the present invention to provide a new and improved lanyard assembly of the aforedescribed class.

Another object of the present invention is to provide such a lanyard assembly which provides a user with means for readily determining whether or not an end of a wire to be pulled is fully or near-fully accepted by the body of the connector before the connector body is crimped about the wire end.

Still another object of the present invention is to provide such a lanyard assembly which enables a user to visually determine whether or not a wire end portion has been inserted endwise into the connector body by a target, or predetermined, distance.

Yet another object of the present invention is to provide such a lanyard assembly whose features improve upon the wire-pulling capacity of the assembly, once the connector body has been crimped about a wire end.

A further object of the present invention is to provide such a lanyard assembly whose cord portion can be secured adjacent the surface of a core of an item about which a wire or cable is desired to be wound and whose connector body can be anchored to the end of the wire desired to be wound about the core during an operation involving the winding of the wire about the core.

A still further object of the present invention is to provide such a lanyard assembly for anchoring a wire to the core of an item about which the wire is wound and which, when used in conjunction with lanyard assemblies of like construction but whose cord portions possess different lengths, can reduce waste upon installation of the wire or cable at a jobsite.

A still further object of the present invention is to provide such a lanyard assembly which is uncomplicated in structure, yet effective in operation.

SUMMARY OF THE INVENTION

This invention resides in an assembly for anchoring a windable material to an item including an elongated core about which the windable material can be wound or from which the windable material can be unwound. The elongated core includes a material-anchoring location to which a terminal end of the windable material can be connected for an operation involving the winding of the windable material about the core.

The assembly includes a lanyard assembly including a cord portion and a connector connected to the cord portion to which the windable material is securable. The connector includes an elongated connector body having two opposite ends and having a hollow interior including an end opening which opens out of the body at one of the two opposite ends thereof and into which the terminal end of the windable material can be inserted for purposes of anchoring the terminal end of the windable material to the connector body. In addition, the core portion of the lanyard assembly has a free end opposite the connector body which is securable to the elongated core adjacent the material-anchoring location so that by securing the free end of the cord portion to the elongated core as aforesaid and anchoring the terminal end of the windable material to the connector body, the windable material is anchored to the core for an operation involving the winding of the windable material about the core.

BRIEF DESCRIPTION OF THE DRAWINGS

FIG. 1 is a perspective view of an embodiment of a crimp-on single-use lanyard assembly within which features of the invention are embodied and a wire cable whose end is desired to be crimped within and pulled endwise with the lanyard assembly.

FIG. 2 is an end elevational view of the connector body of the FIG. 1 lanyard assembly as seen generally from the right in FIG. 1.

DETAILED DESCRIPTION OF AN ILLUSTRATIVE EMBODIMENT

Figure 3:
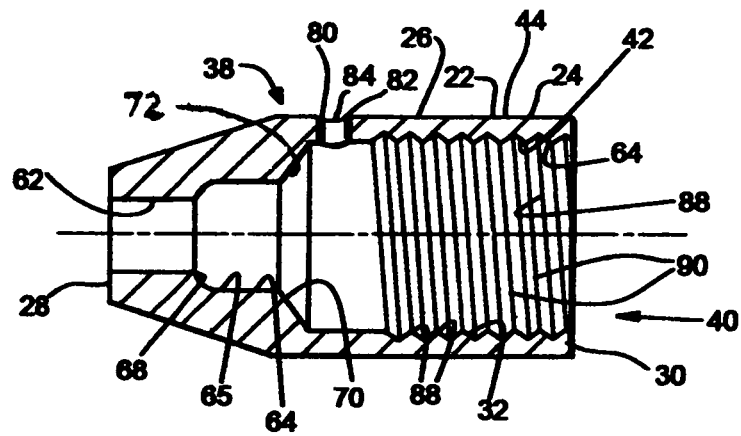
FIG. 3 is a longitudinal cross-sectional view of the FIG. 2 connector body taken about line 3-3 of FIG. 2.

Turning now to the drawings in greater detail and considering first FIG. 1-3, there is illustrated an embodiment, generally indicated 20, of a lanyard assembly within which features of the present invention are embodied and a wire, or wire cable, 18 which is desired to be crimped within and pulled upon with the lanyard assembly 20 in an endwise direction which corresponds generally to the longitudinal axis of the wire 18. Briefly, the depicted lanyard assembly 20 includes a cord portion 22 to which a suitable pulling device, or wire puller, (e.g. not shown) can be secured for the purpose of pulling the assembly 20 and an elongated connector 24 within which the cord portion 22 is secured. The connector 24 includes a body 26 having two opposite ends 28, 30 and a hollow interior 32 which extends between the ends 28, 30. The hollow interior 32 has an end opening 33 at one end 30 of the connector body 26 which opens out of the body end 30 and is adapted to accept an end portion, indicated 34, of the wire 18 which is inserted endwise into the connector body 26 to a fully-accepted position therein at which the connector body 26 can be crimped, or swaged, about the wire end portion 34. Although the connector body 26 is comprised of metal, it is commonly a relatively soft metal, such as aluminum, to permit the body to be crimped about the wire 18 with relative ease.

As will be apparent herein and with reference still to FIGS. 1-3, the connector body 26 includes means, generally indicated 38, enabling a user to visually determine whether or not the wire end portion 34 has been inserted endwise into the connector body 26 by a target, or predetermined, distance. In practice, the target distance that the wire end portion 34 is desired to be inserted into the connector body 26 is sufficient to ensure that when the connector body 26 is subsequently crimped about the wire end portion 34, the surface area of the wire end portion 34 being crimped within the connector body 26 is substantially maximized. In addition, the connector body 26 also includes projection-defining means, generally indicated 40, associated with the interior 32 of the connector body 26 for enhancing the gripping engagement between the surfaces, indicated 42, of the connector body interior 32 and the exterior surface of the wire end portion 34 when the connector body 26 is crimped about the wire end portion 34.

Figure 4:
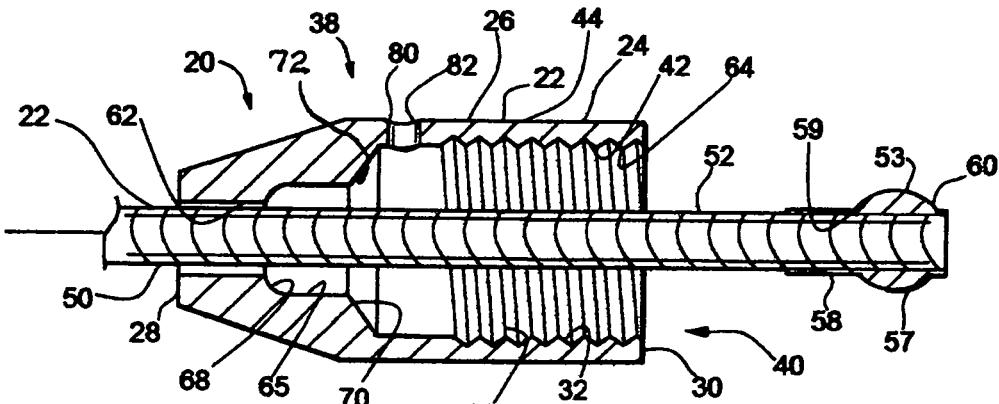
FIG. 4 is a longitudinal cross-sectional view of the connector body of the FIG. 1 lanyard assembly and an end of the cord portion which is secured within the connector body.

With reference to FIGS. 1 and 4, the cord portion 22 is comprised of a length of steel cable 50 having one end portion 52 to which a metal bolus 53 is attached and another end portion 54 opposite the one end 52 which is looped back upon and secured to itself with a metal band 55 to form a loop 56. As best shown in FIG. 4, the metal bolus 53 has a rounded portion 57 and a shank 58 which extends from one side of the rounded portion 57. A through-opening 59 is defined through the rounded portion 57 and shank 58, and the cable end portion 52 is secured within the through-opening 59. To this end, the cable end portion 52 is positioned within the through-opening 59 and the shank 58 is swaged about the cable end portion 52 to firmly secure the bolus 53 thereabout. The rounded portion 57 of the bolus 53 provides the cord portion 22 with an enlarged end portion 60, and as will be apparent herein, the enlarged end portion 60 of the cable 50 is positioned within and cooperates with the connector body 26 to prevent the withdrawal of the cord portion 22 from the connector body 26 through the end 28 thereof. Furthermore, the rounded portion of the bolus 53 permits the cord portion 22 to swivel within the connector body 22.

With reference again to FIGS. 1-3, the exterior surface 44 of the connector body 26 is substantially cylindrical in form along a major portion of the length of the body 26. Meanwhile, the hollow interior 32 of the body 26 extends axially along the full length of the body 26 and opens out of the body 26 at each of its ends 28 or 30. In addition, the hollow interior 32 includes a first region 62 adjacent the body end 28 which is substantially circular in cross section as a path is traced along the length of the hollow interior 32 from the body end 28, and the hollow interior 32 includes a second, or wire-accepting, region 64 adjacent the body end 30 which is also substantially circular in cross section as a path is traced along the hollow interior 32 from the body end 30. The diameter of the first region 46 is large enough to accept the cable 50 of the cord portion 22 disposed therein yet is small enough to prevent the passage of the enlarged end portion 60 axially therethrough. Meanwhile, the diameter of the second region 64 is sized to closely accept the end portion 34 of the wire 18 when the wire end portion 34 is inserted endwise therein.

At the end of the first region 62 opposite the body end 28, the hollow interior 32 includes an intermediate region 65 having a cross section which is slightly larger in diameter than that of the first region 62 and which has a rounded end section 68 adjacent the first region 62 which serves as a seat for the enlarged end portion 60 or, more specifically, the rounded portion 57 of the bolus 53 when the cord portion 22 is pulled axially of the hollow interior 32 from the loop 56 thereof. Because the shape of the rounded end section 68 is complementary to that of the surface of the rounded portion 57 of the bolus 53, the cord portion 22 is permitted to swivel within the connector body 22 as the rounded portion 57 of the bolus 53 is permitted to slidably move, or rotate, relative to the surface of the rounded end section 68.

Furthermore, the hollow interior 32 includes a transition region 70 of substantially conical shape and which joins the second region 64 to the intermediate region 66. As best shown in FIG. 3, the diameter of the transition region 70 decreases in size as a path is traced therealong from the second region 64 to the intermediate region 66.

As will be apparent herein, the surface of the transition region 70 provides an abutment surface 72 against which the wire end portion 34 is adapted to abut when the wire end portion 34 is fully inserted endwise into the hollow interior 32 through the connector body end 30 and beyond which the wire end portion 34 cannot be inserted endwise any further into the hollow interior 32. In addition and as a pulling operation is performed with the lanyard assembly 20, the transition region 70 funnels, or directs, the enlarged end portion 60 of the cord portion 22 axially along the length of the transition region 70 from the cable body end 30 until the enlarged end portion 60 becomes seated within the rounded section 68 of the intermediate region 65. In other words, the transition region 70 acts as a centering passageway which funnels, or directs, the rounded portion 57 of the bolus 53 axially of the hollow interior 32 into a seated condition against the rounded section 68 of the intermediate region 65.

With reference again to FIGS. 1-3, it is a feature of the lanyard assembly 20 that its enabling means 38 enables a user to visually determine whether the end portion 34 of the wire 18 has been inserted endwise into the hollow interior 32 through the end opening 33 by a target, or predetermined, distance along the length of the hollow interior 32 so that when the connector body 26 is subsequently crimped about the wire end portion 34, a relatively large amount of surface area of the wire end portion 34 is crimped, or mashed, between the interior surface 42 of the connector body 26.

Within the depicted embodiment 20, the enabling means 38 includes a window 80 defined within one side of the connector body 26 which enables a user to visually determine whether the wire end portion 34 has been inserted endwise into the connector body 26 through the end opening 33 thereof to a position therein at which the wire end portion 34 is either fully-accepted or nearly fully-accepted by the second (i.e. wire-accepting) region 64 of the connector body 26. That is to say, the window 80 enables the user to visually determine whether the wire end portion 34 has been inserted endwise into the connector body 22 to a location within the hollow interior 32 at which the wire end portion 34 is viewable through the window 80.

In practice and since the window 80 is spaced from the end opening 33 by a preselected distance (e.g. 1.75 inches) and a viewer is able to visually determine (by looking through the window 80) whether the wire end portion 34 has been inserted into and along the hollow interior 32 of at least as far as the preselected distance, the aforementioned predetermined distance is substantially equal to the preselected distance.

Within the depicted embodiment 20, the window 80 is provided by a two-ended passageway 82 which opens at one end out of the exterior surface 44 of the connector body 26 and opens at its other end along the interior surface 42 of the connector body 26. The passageway 82 is provided by a bore 84 (FIG. 3) of substantially circular cross section formed in one side of the connector body 26, but passageways of other cross-sectional shapes can be had. By way of example, the bore 84 has a diameter of about 0.25 inches, but the diameter of the bore 84 can be any of a number of alternative sizes as long as the user can see the wire end portion 34 through the window 80 when the wire end portion 34 is disposed at a desired location along the length of the second (i.e. wire-accepting) region 64, such as a location at which the wire end portion 34 is disposed adjacent the abutment surface 72.

Preferably, the window 80 enables a user to visually determine whether the wire end portion 34 has been inserted endwise along the second, or wire-accepting, region 64 to a position therealong at which the wire end portion 34 has been fully or near-fully inserted along the length of the second region 64. Accordingly and in order for the user to visually determine whether the wire end portion 34 has been inserted into close proximity to, or adjacent, the abutment surface 72 (beyond which the wire end portion 34 cannot be inserted further into the connector body 26), the window 80 is disposed along the connector body 26 so that the user can visually make that determination. In this connection and within the depicted embodiment 20, the window 80 is disposed along the length of the connector body 26 so that the user can determine whether the wire end portion 34 has been inserted through the end opening 33 and along the second region 64 to within about 0.125 inches of the abutment surface 72. Consequently and to this end, the center of the window 80 is formed within (and through one side of) the portion of the connector body 26 which encircles the second region 64 (i.e. the wire-accepting portion) of the hollow interior 32 and is disposed at a location therealong which is about 0.375 inches from the abutment surface 72.

By way of example, the diameter of the window 80 is of such a size in relation to the thickness of the connector body wall (i.e. the distance between the interior and exterior surfaces 42 and 44 that the inserted wire end portion 34 cannot be seen through the window 80 by the user until the wire end portion 34 has been inserted through the connector body interior to about the longitudinal axis of the window 80. Therefore and in such an instance, unless the wire end portion 34 is viewable at all through the window 80, the wire end portion 34 will not have been inserted far enough along the connector body interior 32.

Figure 5:
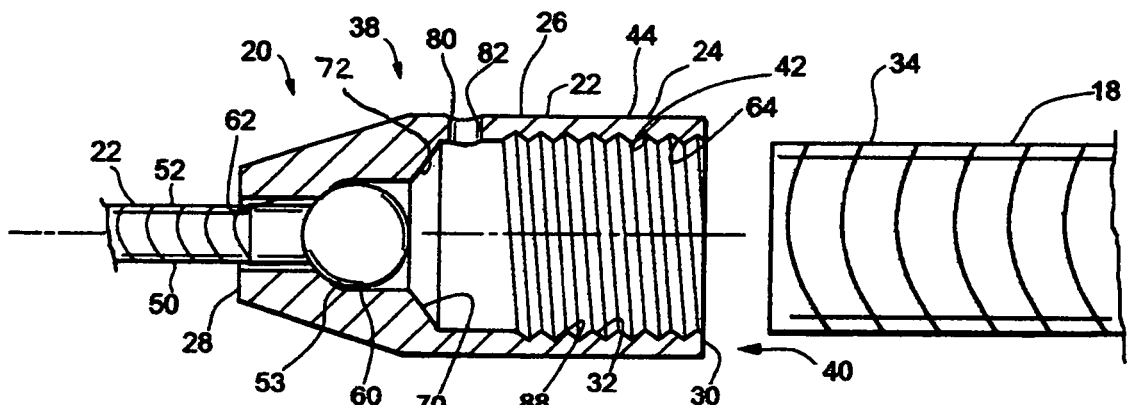
FIGS. 5-7 are views similar to that of FIG. 4 depicting a sequence of events terminating in the crimping of the FIG. 1 lanyard assembly about an end of the FIG. 1 wire cable.
Figure 6:
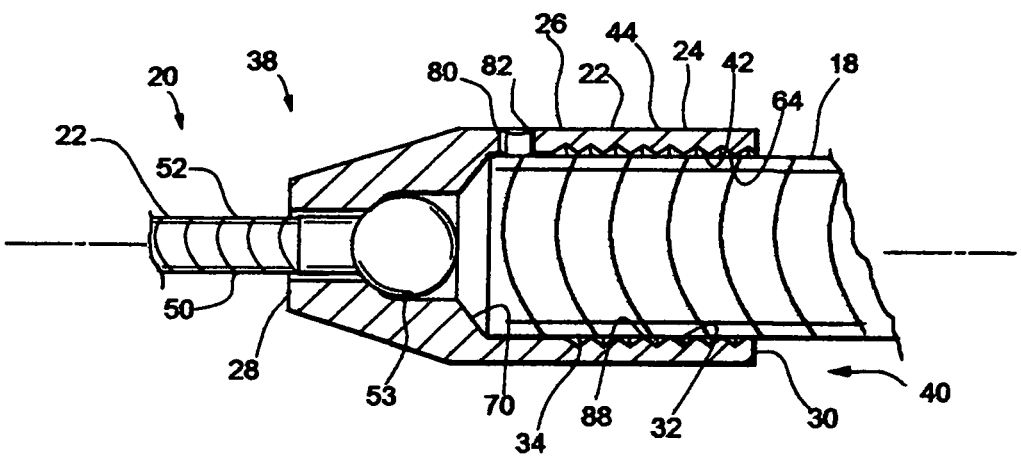
Figure 7:
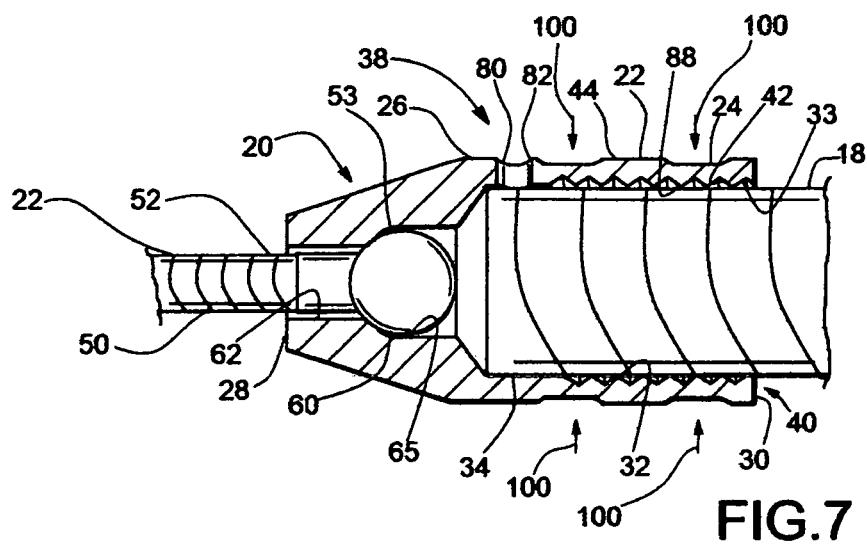
Figure 8:
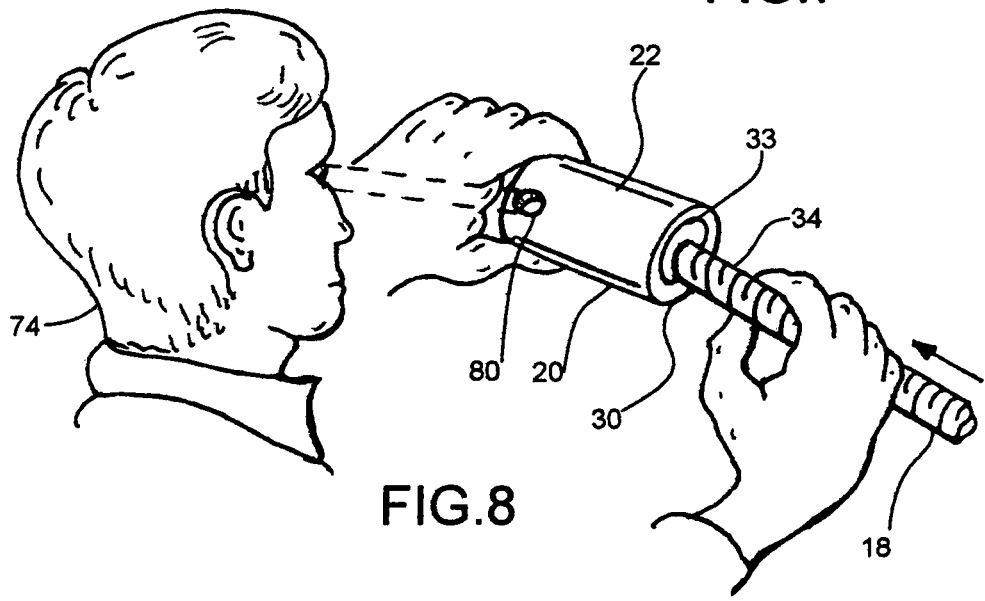
FIG. 8 is a perspective view of the lanyard assembly and wire cable of FIG. 1 in which the wire cable is being inserted endwise into the connector body of the lanyard assembly by a user.

In preparation of a wire-pulling operation to be performed with the lanyard assembly 20, the end portion 34 of the wire 18 is axially aligned with the connector body 26 at the end opening thereof as illustrated in FIG. 5. Then, the wire end portion 34 is inserted endwise into the connector body 26 through the end opening 33 thereof until the wire end portion 34 abuts or is positioned in relatively close proximity to the abutment surface 72 as illustrated in FIG. 6. With the wire end portion 34 disposed within the connector body 26 (when in the FIG. 6 position), an appreciable region of the exterior surface 44 of the connector body 26 is crimped, or swaged, about the wire end portion 34 (through the application of radially inwardly-directed forces applied to the exterior of the connector body 26 along the directions indicated by the FIG. 7 arrows 100) so that the interior surface 42 of the connector body 26 is crimped, or mashed against, the exterior surface of the wire end portion 34 as best illustrated in FIG. 7. It follows that as the wire end portion 34 is being inserted into the connector body 26, the user 74 (FIG. 8) can observe the wire end portion 34 as it closely approaches the abutment surface 72, as is depicted in FIG. 8.

An advantage provided by the window 80 is that it enables a user to visually ensure that the wire end portion 34 has been inserted into the connector body 26 to either a fully or nearly fully-inserted condition within the second region 64 of the hollow interior 32 before the body 26 is crimped about the wire end portion 34. By visually ensuring that the wire end portion 34 has been inserted endwise into the connector body 26 to such a condition before the connector body 26 is crimped about the wire end portion 34, the likelihood is increased that the subsequent crimping of the connector body 26 about the wire end portion 34 will result in the maximization of the surface area of the wire end portion 34 being crimped within the interior surface 42 of the connector body 26.

Figure 9:
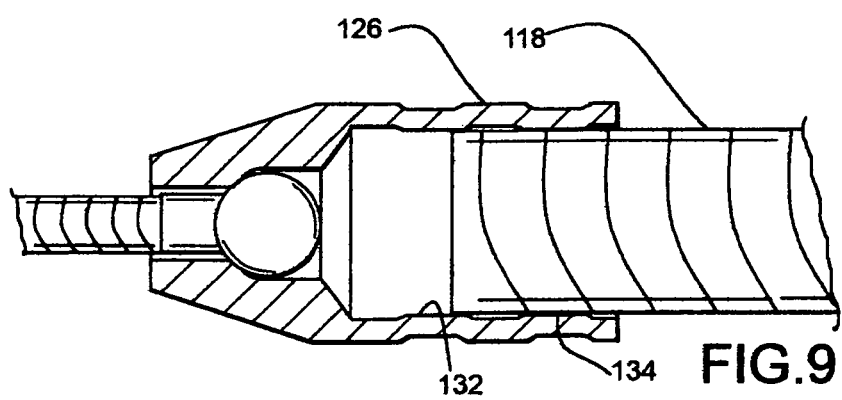
FIG. 9 is a view similar to that of FIG. 7 of another lanyard assembly and wire cable, but depicting the disposition of the wire cable which has not been fully inserted within the connector body of the lanyard assembly before the connector body has been crimped about the wire cable.

The aforedescribed advantage provided by the window 80 can be readily appreciated when considering the possible crimping of a connector body of a lanyard assembly about a wire end portion 34 which has not been fully, or nearly fully, positioned within the interior of the connector body. For example, there is depicted in FIG. 9 an example of a window-less connector body 126 (having a relatively smooth interior surface 132) within which a wire 118 whose wire end portion 134 has been only partially (e.g. almost one-half-way) inserted endwise within the connector body 126 before being crimped thereabout. Since the wire end portion 134 is positioned so far from a fully-inserted condition within the connector body 126 before being crimped within the connector body 126, there is much less surface area (e.g. roughly only about one-half of the possible surface area) of the wire end portion 134 which is crimped within the interior surface 132 of the connector body 126. Thus, the window 80, such as is provided in the connector body 26 of the embodiment 20 of FIGS. 1-7, enables a user to visually confirm (before the connector body has been crimped about the wire end portion) that the inserted wire end portion has been either fully-inserted or nearly fully-inserted into the connector body 26 and thereby reduces any likelihood that the connector body will be subsequently crimped about the wire end portion before the wire end portion has been inserted to a desired position within the connector body 26 for crimping purpose, and applicants' invention is advantageous in this respect.

With reference again to FIGS. 3-7, it is also a feature of the embodiment 20 that the projection-defining means 40, introduced above, includes a plurality of projections 88 disposed across the surface 42 of the connector body interior 32 so that when the connector body 26 is crimped about the wire end portion 34, the projections 88 effectively bite into the surface of the wire end portion 34 and enhance the frictional gripping engagement between the interior surface 42 of the connector body 26 and the exterior surface of the wire end portion 34. The projections 88 are preferably provided by a coarseness of the surface 42. In other words, the projections 88 are a consequence of the coarse, or rough, nature of the surface 42.

While the coarseness of the surface 42 (and the projections 88 resulting therein) can be induced or formed within the hollow interior 32 in any of a number of ways (such as the formation of grooves therealong or the creation of coarseness through a chemical etching technique), within the depicted embodiment 20, the coarse interior surface 42 (with its projections 88 disposed thereacross) is disposed within the second region 64 of the connector body 26 and is provided by a series of internal threads 90 which extend for a substantial distance along the length of the second region 64 from the end opening 33 of the connector body 26, and it is the edges of these threads 90 which provide the projections 88 of the coarse interior surface 42. When the connector body 26 is crimped about a wire end portion 34 which has been fully, or nearly fully, inserted within the hollow interior 32 of the connector body 26, the projections 88 of the coarse interior surface 42 effectively bite into the outer surface of the inserted wire end portion 34 and thereby enhance the grip of the connector body 26 about the wire end portion 34. Moreover, the coarseness of the surface 42 provides a greater amount of exposed surface than is provided by a smooth surface of the same size, and it is believed that this greater amount of exposed surface area (capable of contacting the wire end portion 34 when crimped thereabout) also contributes to the enhanced grip of the connector body 26 about the wire end portion 34. In any event, the enhancing of the grip of the wire end portion 34 by the coarse interior surface 42 of the connector body 26 has been found to substantially increase the load-pulling capacity of the connector body over one which has a relatively smooth interior surface, and the coarse surface 42 is advantageous in this respect.

Figure 10:
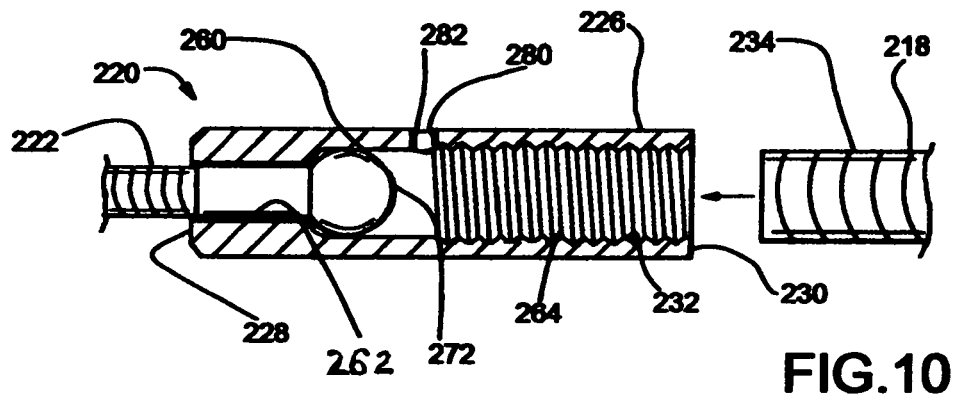
FIG. 10 is a view similar to that of FIG. 5 of an alternative crimp-on single-use lanyard assembly within which features of the present invention are embodied.

It will be understood that numerous modifications and substitutions can be had to the aforedescribed embodiment 20 without departing from the spirit of the invention. For example, although the aforedescribed embodiment 20 has been shown and described as including a hollow interior 32 which possesses a transition region 70 (FIG. 3) therealong which helps to center the enlarged end portion 60 of a cord portion 22, an embodiment of a lanyard assembly within which the features of the present invention are embodied may not possess such a transition region. For example, there is depicted in FIG. 10 an embodiment, generally indicated 220, of a lanyard assembly having a cord portion 222 and a window-bearing connector body 226 which is adapted to be crimped about the wire end portion 234 of a wire 218 and wherein the connector body 226 has a hollow interior 232 which possesses a first region 262 which extends axially inwardly of the body 226 from one end, indicated 228, thereof and a second region 264 which extends axially into the body 226 from the opposite end 230 thereof but does not possess any transition region disposed between the first and second regions 262 and 264 for centering the rounded end portion, indicated 260 of the cord portion 222 when the cord portion 222 is pulled endwise through the connector body end 228. Within the lanyard assembly 220 of FIG. 10, an abutment surface, indicated 272, within the connector body 222 serves as the abutment surface against which the wire end portion 234 is positioned when fully inserted therein is provided by the enlarged end portion 260 of the cord portion 222. Accordingly and in accordance with the present invention, the window, indicated 280, provided within one side of the connector body 226 is provided by a passageway 282 disposed along the length of the portion of the connector body 226 and is located within, for example, about 0.125 inches from the enlarged end portion 260 when the enlarged end portion 260 is seated within, or pulled into, its depicted FIG. 10 position within the connector body 226.

Figure 11:
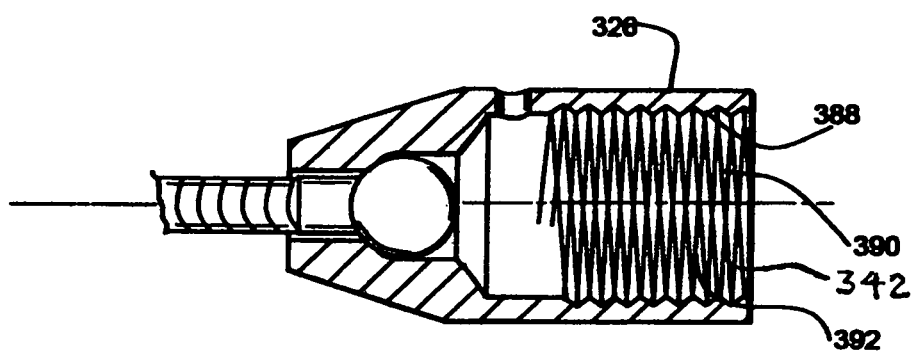
FIG. 11 is a view similar to that of FIG. 5 of still another crimp-on single use lanyard assembly within which features of the present invention are embodied.

Furthermore and although the ridges 88 of the knurled interior surface 42 of the connector body 26 has been shown and described as being provided by the edges of internal threads 90, the ridges 88 can take an alternative form. For example, there is illustrated in FIG. 11, a window-providing connector body 326 having a knurled interior surface 342 whose ridges, indicated 388, are provided by edges 386 formed from a series of counter-clockwise-directed internal threads 390 and a series of clockwise-directed internal threads 392 being formed therein.

Heretofore and following a wire-pulling operation performed with a lanyard assembly of a class with which this invention is concerned, the wire is cut, or severed, from the connector body adjacent the wire-accepting opening of the connector body, a lug (e.g. a connector lug) is commonly joined to the remaining, or free, end of the wire, and the lug is used to anchor the wire at a desired location, such as to a terminal of a junction box. To enhance the efficiency of and to reduce waste involved in such a wire-anchoring process, applicants have devised a scheme by which the connector body, or a part thereof, can be used to aid in the securement of the wire at a desired location. To this end, applicants have developed a lanyard assembly having a crimpable connector body which provides a component for use as a lug or provides a component to which a lug can be secured for the purpose of anchoring the wire at a desired location by way of the secured lug. That is to say, in this aspect of applicants' invention, the connector body, or a component thereof, need not be detached from the wire crimped therein before the wire is secured at a desired location by way of the connector body.

Figure 12:
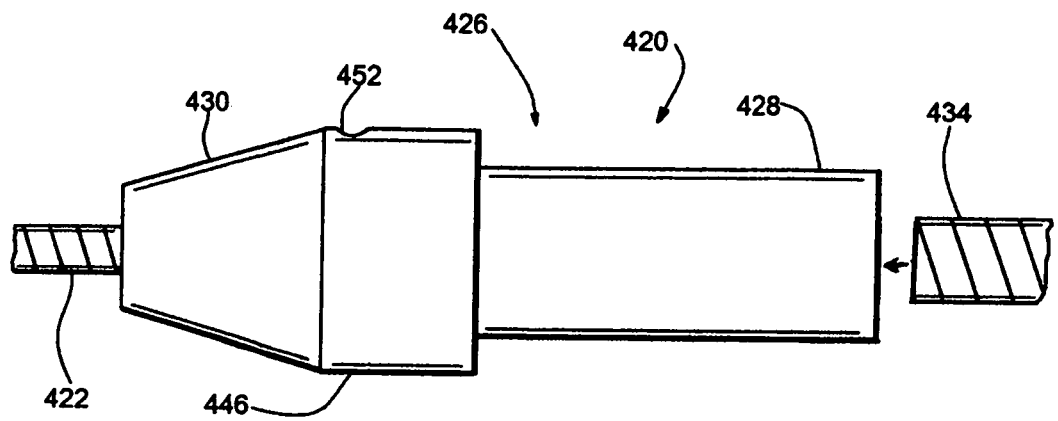
FIG. 12 is a side elevation view of one more crimp-on lanyard assembly within which features of the present invention are embodied and a wire cable whose end is desired to be crimped within and pulled endwise with the lanyard assembly.
Figure 13:
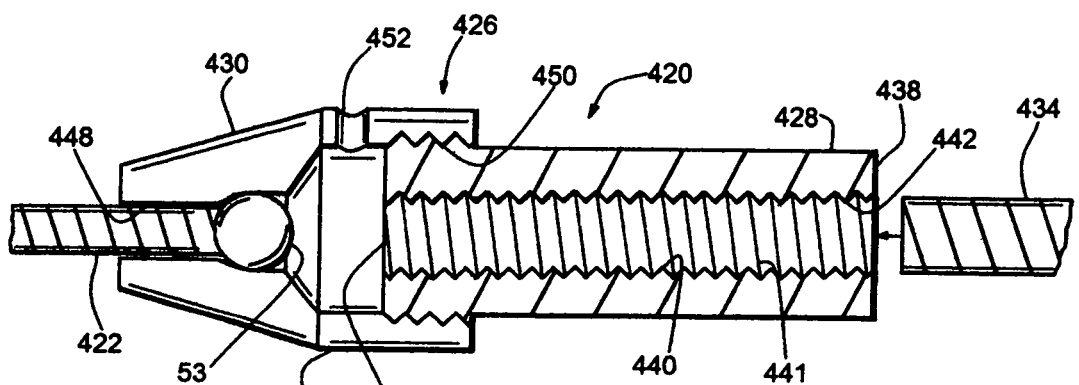
FIG. 13 is a longitudinal cross-sectional view of the connector body of the FIG. 12 lanyard assembly, shown assembled.
Figure 14:
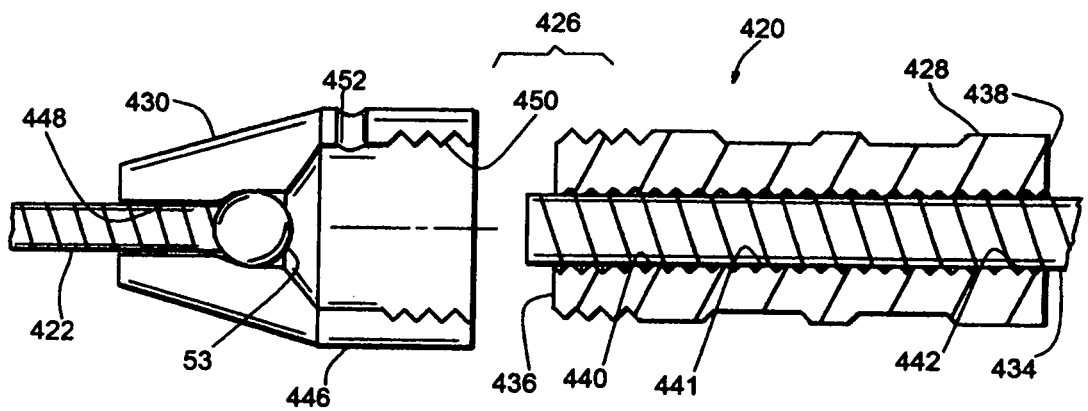
FIG. 14 is a view similar to that of FIG. 13 but showing the connector body of the FIG. 12 lanyard assembly in an exploded condition.

With reference to FIGS. 12-14 there is illustrated a lanyard assembly 420 having a cord portion 422 and a multiple-component connector body 426 to which the cord portion 422 is secured. The cord portion 422 is comparable in construction to the cord portion 22 of the embodiment 20 of FIGS. 1-3 (complete with a metal bolus 53) while the connector body 426 is comprised of a first, or primary, component 428 which is crimpable about a wire end portion 434 and a second, or secondary, component 430 to which the bolus-including end of the cord portion 422 is secured. The primary component 428 includes two opposite ends 436, 438 and a hollow interior 440 having a wire-accepting opening 442 at the component end 438 and within which the wire end portion 434 can be closely accepted for securement of the wire end portion 434 to the connector body 426 as the primary component 434 is crimped thereabout. Preferably, the hollow interior 440 is provided with internal threads 441 which extend therealong from the component end 438 for enhancing the grip of the primary component 428 about the wire end portion 434 when the component 428 is crimped thereabout. In addition, the exterior surface of the primary component 428 is externally-threaded adjacent its end 436.

Meanwhile, the secondary component 430 includes a body 446 having a through-opening 448 which extends axially therethrough, and one end section, indicated 450, of the through-opening 448 is internally-threaded to permit the secondary component 430 to be threadably secured to the primary component 428 by way of the threads provided about the end 436 thereof. The other, or opposite, end section of the through-opening 448 is provided with a passageway 451 through with the cord of the cord portion 422 extends and a concave portion 454 within which the bolus 53 of the cord portion 422 is adapted to seat. In addition, the body 446 is provided with a radially-extending passageway 452 which opens into the through-opening 448 adjacent the concave portion 454 and which provides a window enabling a user to visually determine whether the wire end portion 434 has been inserted to a position adjacent the concave portion 454 prior to an operation which crimps the connector component 428 about the wire end portion 434. It follows from the foregoing that the secondary component 430 provides a removable cap which is securable to the primary component 428 by screwing the secondary component 430 about the component end 436.

Following a wire-pulling operation during which the lanyard assembly 420 is used for pulling the wire end portion 434 to a desired location and before the wire end portion 434 is connected, or anchored, at the desired location, the cord portion 422 is removed from the primary component 428 of the connector body 422 by unscrewing the secondary component 430 from the end 436 of the primary component 428. This removal of the secondary component 430 from the primary component 428 leaves exposed the component end 436, and a suitable lug, described herein, can be secured to the exposed component end 436 for securement of the wire end portion 434 to an anchoring location, such as to the terminal of a junction box (not shown).

Figure 15:
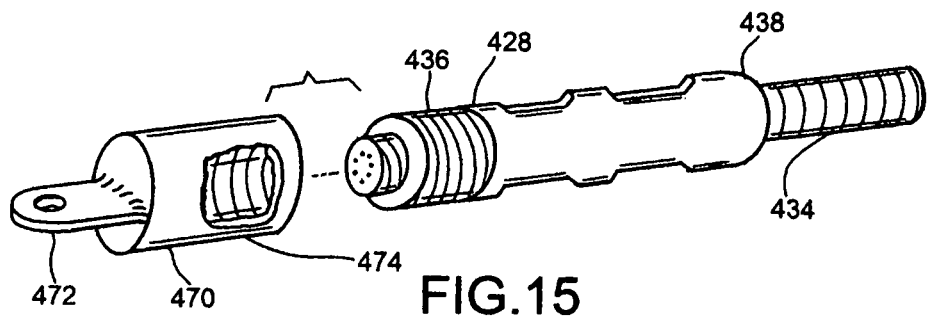
FIG. 15 is a perspective view of the primary component of the connector body of the lanyard assembly of FIG. 12 shown crimped about an end of a wire cable and depicting an example of a connector lug capable of being secured about an end of the primary component.
Figure 16:
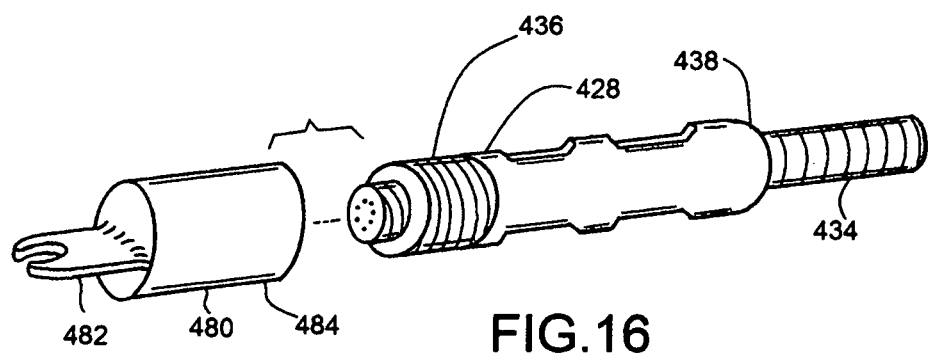
FIG. 16 is a perspective view of the primary component of the connector body of the lanyard assembly of FIG. 12 like that of FIG. 15, but showing another example of a connector lug capable of being secured about an end of the primary component.
Figure 17:
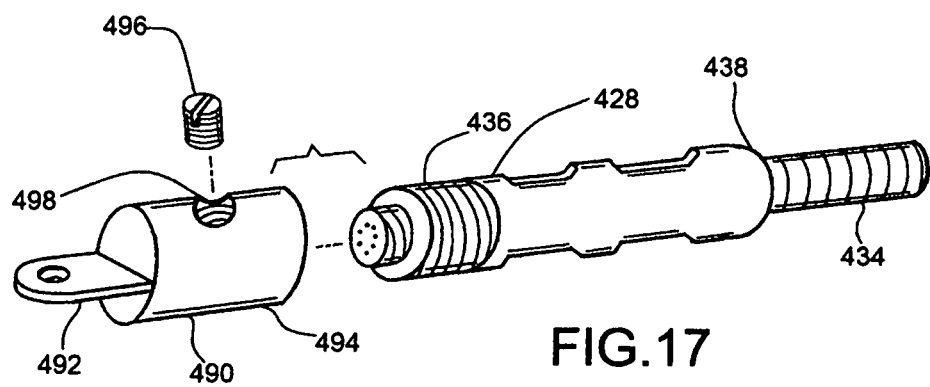
FIG. 17 is a perspective view of the primary component of the connector body of the lanyard assembly of FIG. 12 like that of FIG. 15, but showing still another example of a connector lug capable of being secured about an end of the primary component.

Examples of connector lugs suitable for attachment to the exposed component end 436 are depicted in FIGS. 15-17. In particular, there is depicted in FIG. 15 a connector lug 470 having an eyelet-providing portion 472 (capable of being connected to a post-style terminal) and a hollow sleeve-like portion 474 which is capable of being threadably secured upon the threads provided about the component body end 436. In this connection, the interior of the sleeve-like portion 474 is internally-threaded so that the internal threads of the sleeve-like body 474 threadably mate with those provided about the component body end 436.

By comparison, there is depicted in FIG. 16 a connector lug 480 having a fork-providing portion 482 (capable of being connected to a post-style terminal) and a hollow sleeve-like portion 484 which is capable of being crimped, or otherwise deformably compressed, about the connector body end 436 to permanently secure the connector lug 480 to the connector body component 428. Moreover, there is depicted in FIG. 17 a connector lug 490 having an eyelet-providing portion 492 (capable of being connected to a post-style terminal) and a hollow sleeve-like portion 494 which is capable of being positioned about the connector body end 436 and secured thereto with a set screw 496 directed through an internally-threaded passageway 498 directed radially through one side of the sleeve-like portion 494.

As is the case with any of the connector lugs depicted in FIGS. 15-17, the sleeve-like portion of the lug is positioned about the component end 436, and then the sleeve-like portion is appropriately secured about the component end 436. The opposite (e.g. the eyelet or fork-providing) end portion of the lug is then used to attach the wire end portion 434 at a desired location, such as to a terminal of a junction box.

It will be understood that numerous modifications and substitutions can be had to the aforedescribed lanyard assembly embodiments without departing from the spirit of the invention. For example and although the aforedescribed lanyard assemblies have been shown and described as being utilized for pulling the end of wires or cables through a conduit (and consequently off of a spool or reel about which the wires or cables may be wound), lanyard assemblies embodying features of the present invention can be used at the opposite end of the wires or cables to aid in the securement, or anchoring, of the wires or cable about the reel or cable about which the wires or cable are wound. That is to say that a lanyard assembly in accordance with this invention can be disposed intermediate the surface of a spool about which a wire is intended to be wound and the wire itself so that the (terminal) end of the wire adjacent the spool is anchored to the spool for an operation involving the winding of the wire about the spool. In addition, a window (comparable to the window 80 of the FIG. 1 embodiment 20) can be incorporated within each connector body 546, and the projections (comparable to the projections 88 of the FIG. 1 embodiment 20) can be incorporated within the interior surfaces of each (hollow) connector body 546.

Figure 18:
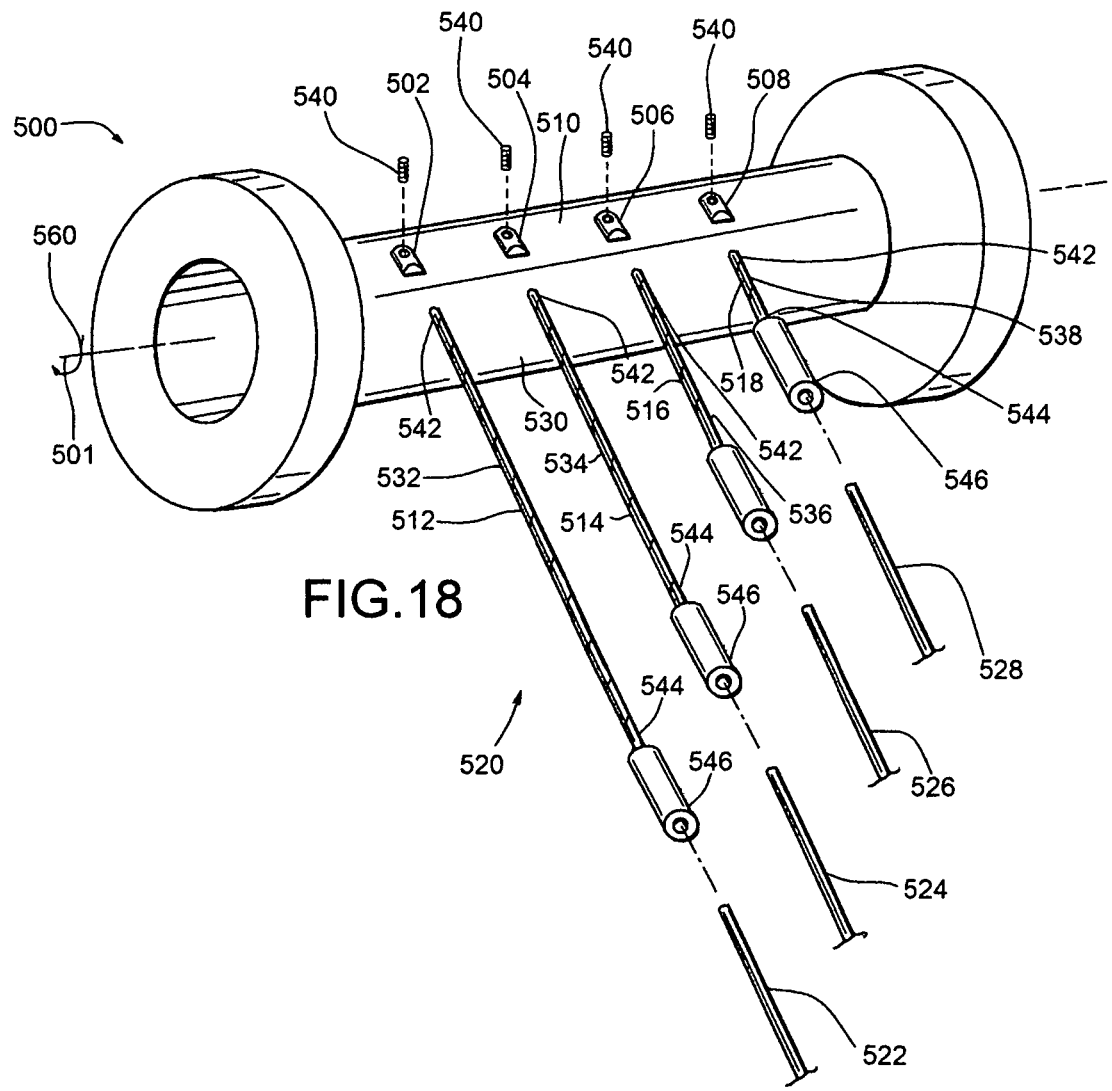
FIG. 18 is a perspective view, shown exploded, of a series of lanyard assemblies being used to anchor the terminal end of a plurality of wires adjacent the surface of a core-including item about which the wires are desired to be wound.

For example, there is illustrated in FIG. 18 a spool 500 having an elongated, cylindrically-shaped core 530 having an arrangement of attachment locations 502, 504, 506 and 508 arranged along the surface, indicated 510, of the core 530 and along a path which extends substantially linearly along the length of the surface 510 of the core 530 and substantially parallel to the longitudinal axis, indicated 501, of the core 530. In addition, there is associated with the core 530 anchor-providing means, generally indicated 520, which include a plurality of lanyard assemblies 512, 514, 516 and 518 which are each joined to the core 530 at a corresponding attachment locations 502, 504, 506 or 508 and which provide the spool 500 with anchoring locations (described herein) at which wires 522, 524, 526 and 528 are anchored for purposes of winding the wires 522, 524, 526 and 528 about the core 530. Moreover, each attachment location 502, 504, 506 or 508 is disposed within a corresponding region, or zone, which extends for a predetermined distance along the length of the core surface 510 and within which a corresponding wire 522, 524, 526 or 528 is intended to be wound.

In connection with the foregoing, each lanyard assembly 512, 514, 516 or 518 includes a cord portion, or tension member 532, 534, 536 or 528 (wherein each member 532, 534, 536 or 538 includes two opposite ends 542 and 544) and a connector body 546 joined to a tension member 532, 534, 536 or 538. One end 542 of each tension member 532, 534, 536 or 538 is securely attached, as with a bolt, set screw or suitable locking or tie-down arrangement, to the core 530 at a corresponding attachment location 502, 504, 506 or 508 along the core surface 510. Meanwhile, the connector body 546 is connected to each tension member 532, 534, 536 or 538 at the end 544 thereof for providing the spool 500 with a suitable anchor assembly to which a corresponding wire 522, 524, 526 or 528 can be anchored for the purpose of winding the wires 522, 524, 526 and 528 about the surface 510 of the core 530.

Figure 19:
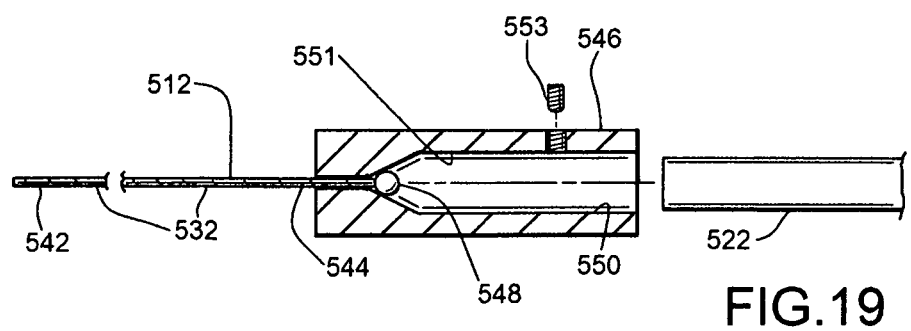
FIG. 19 is a longitudinal cross-sectional view of one of the lanyard assemblies of FIG. 18, shown exploded.

As exemplified by the lanyard assembly 512 of FIG. 19, some aspects of the structure of each lanyard assembly 512, 514, 516 or 518 is comparable to that of the lanyard assemblies described herein, whose end 544 of each tension member 532, 534, 536 or 538 is provided with a bolus 548 and wherein each connector body 546 defines a passageway 551 extending axially therethrough and within which the bolus 548 is captured. Meanwhile, the passageway 551 provides an opening 550 of larger diameter which opens out of the end of the connector body 546 opposite the end thereof from which the tension member 532, 534, 536 or 538 extends. The opening 550 is sized to accept the end of a corresponding wire 522, 524, 526 or 528 directed endwise therein, and there is provided a set screw 553 which is threadably accepted within a side of the connector body 546 for releasably securing the end of a corresponding wire 522, 524, 526 or 528 within the opening 550. An advantage provided by the set screw 553 to secure the terminal end of a wire 522, 524, 526 or 528 within a connector body 546 is that the set screw 553 provides a means by which a wire can either be quickly attached to the connector body 546 in preparation of an operation involving the winding of the wire about the spool surface 510 or can be quickly detached from the connector body 546 upon completion of a wire unwinding operation. However and as an alternative to the use of a set screw 553 or other quick release componentry for securing a wire within the connector body 546, the connector body 546 can be crimped about a corresponding wire 522, 524, 526 or 528 inserted therein.

Figure 20:
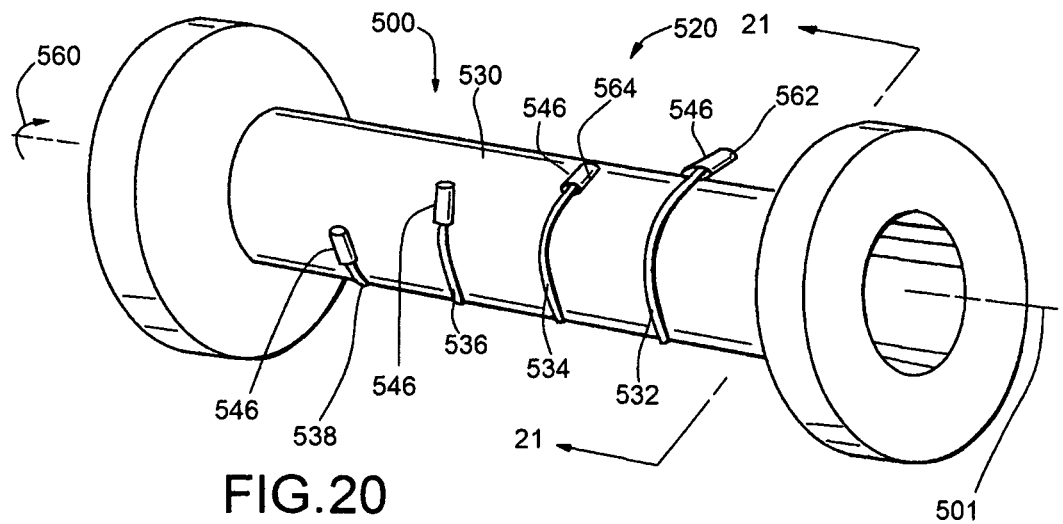
FIG. 20 is a perspective view of the core and lanyard assemblies of FIG. 18 shown from an alternative angle and depicting the lanyard assemblies being wrapped about the core.
Figure 21:
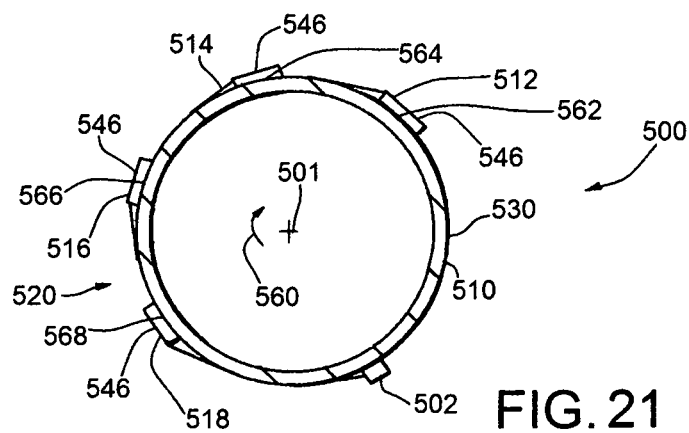
FIG. 21 is a cross-sectional view taken about along line 21-21 of FIG. 20.
Figure 22:
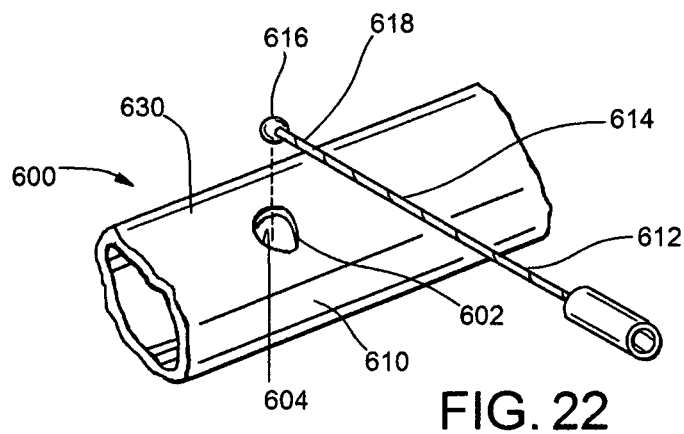
FIG. 22 is a perspective view, shown exploded, of a fragment of a core to which the cord portion of a lanyard assembly can be interlocked for purposes of anchoring the lanyard assembly (and a wire connected thereto) to the core.

Furthermore, the lengths of the tension members 532, 534, 536 and 538 are different from one another so that when the tension member ends 542 of the tensions members 532, 534, 536 and 538 are secured to the core 530 at the corresponding attachment locations 502, 504, 506 and 508 and the connector bodies 546 (and tension members 532, 534, 536 and 538) are pulled taut about the surface 510 of the core 530 along the intended direction of rotation, indicated by the direction arrow 560 in FIGS. 18, 20 and 21, of the core 530 during a wire unwinding operation, the connector bodies 546 overlie positions, or locations, adjacent or along the core surface 510 in a desirable staggered relationship. More specifically and with reference to FIGS. 20 and 21, the connector body 546 of the lanyard assembly 512 is disposed at a first location, indicated 562 in FIG. 21, and the connector body 546 of the lanyard assembly 514 is disposed at a second location, indicated 564 in FIG. 21, which is circumferentially spaced about the outer surface 510 of the core 530 from the first location 562 by a predetermined measured distance and in a circumferential direction from a path, or imaginary line, traced axially along the core surface 510 and which includes the first location 562 and which circumferential direction is opposite the direction, indicated by the FIG. 21 direction arrow 560, in which the spool 500 is intended to be rotated during a wire unwinding process.

Similarly, the connector body 546 of the lanyard assembly 516 is disposed at a third location, indicated 566 in FIG. 21, which is circumferentially spaced about the outer surface 510 of the core 530 from the second location 564 by a predetermined measured distance and in a circumferential direction from a path, or imaginary line, traced axially along the core surface 510 and which includes the second location 564 and which circumferential direction is opposite the direction, indicated by the FIG. 18 direction arrow 560, in which the spool 500 is intended to be rotated during a wire unwinding process. Similar still, the connector body 546 of the lanyard assembly 518 is disposed at a fourth location, indicated 568 in FIG. 18, which is circumferentially spaced about the outer surface 510 of the core 530 from the third location 566 by a predetermined measured distance and in a circumferential direction from a path, or imaginary line, traced axially along the core surface 510 and which includes the third location 566 and which circumferential direction is opposite the direction, indicated by the FIG. 18 direction arrow 560, in which the spool 500 is intended to be rotated during a wire unwinding process.

It follows from the foregoing that the locations 562, 564, 566 and 568 along or adjacent the surface of a core of a spool embodying features of the present invention need not be fixedly secured at a particular location along or adjacent the surface of the spool but instead can be provided at the ends, such as at the tension member ends 544, of flexible members which are secured adjacent the core surface 510.

Furthermore and although the anchor locations 562, 564, 566 and 568 have been described as being dependent upon (or measured from) attachment locations 502, 504, 506 and 508 which have been shown and described as being directly associated with the core 530 of the spool 500, such anchoring locations can be provided along (or incorporated within) another component of the spool 500, such as an end flange, joined to the core 530. Accordingly, the principles of the present invention can be variously applied.

Yet further still, there is depicted in FIG. 21 still one more spool 600 wherein the spool 600 includes a core 630 having attachment locations, such as the location indicated 602 in FIG. 21, provided by a teardrop-shaped opening 604 defined within the surface, indicated 610 of the core 630. The spool 600 also includes a lanyard assembly 612 whose tension member 614 includes a bolus 616 which is fixedly attached adjacent one end, indicated 618, thereof of the tension member 614 for securement of the lanyard assembly 612 adjacent the surface 610 of the core 630 by simply inserting the bolus 616 through the larger portion of the opening 604 to thereby hook the anchor-providing assembly to the core 630. It follows that the bolus 616 is sized to be accepted by the larger portion of the opening 604, but not be able to pass through (i.e. out of) the opening 604 through the smaller portion thereof. It also follows that in accordance with the broader principles of the present invention, the securement of an anchor-providing assembly, such as the lanyard assembly 612, adjacent the surface of a spool core need not require additional attachment componentry, such as screws or bolts.

Accordingly, the aforedescribed embodiments are intended for the purpose of illustration and not as limitation.

The invention claimed is:

1. An assembly for anchoring a windable material to an item including an elongated core about which the windable material can be wound or from which the windable material can be unwound, wherein the windable material includes a terminal end; the assembly comprising:

a lanyard assembly including a cord portion having two opposite ends and a connector connected to one of the two opposite ends of the cord portion to which the windable material is securable, the connector includes an elongated connector body having two opposite ends and having a hollow interior including an end opening which opens out of the body at one of the two opposite ends thereof and into which the terminal end of the windable material can be inserted for purposes of anchoring the terminal end of the windable material to the connector body; and the cord portion of the lanyard assembly has a free end opposite the connector body which is securable to the elongated core so that by securing the free end of the cord portion to the elongated core as aforesaid and anchoring the terminal end of the windable material to the connector body after inserting the terminal end of the windable material into the end opening of the elongated connector body, the lanyard assembly is disposed between the elongated core and the windable material as a path is traced between the elongated core and the windable material and along the lanyard assembly, and the windable material is anchored to the elongated core by way of the lanyard assembly for an operation involving the winding of the windable material about the elongated core; and wherein the hollow interior of the connector body defines interior surfaces and the terminal end of the windable material defines an exterior surface, and the connector body has a plurality of projections disposed across the interior surfaces of the hollow interior prior to insertion of the terminal end of the windable material into the hollow interior and wherein the plurality of projections face inwardly of the hollow interior so that when the connector body is subsequently crimped about the inserted windable material, the interior surfaces of the hollow interior are mashed against the exterior surface of the windable material so that the projections bite into the windable material.

2. The assembly as defined in claim 1 wherein the connector body includes a window which extends from the hollow interior of the connector body and opens out of the exterior surface thereof and through which a user can visually determine whether the terminal end of the windable material has been inserted endwise into the hollow interior of the connector body by a predetermined amount.

3. The assembly as defined in claim 1 wherein the connector body is releasably securable to the windable material to accommodate, when desired, a quick release of the windable material from the connector body.

4. The assembly as defined in claim 1 wherein the elongated core has an outer surface and first and second ends, and the outer surface has first and second regions disposed axially along the elongated core between the first and second ends and about which first and second windable materials can be wound or from which the first and second windable materials can be unwound, wherein each of the first and second windable materials includes a terminal end and wherein there is associated with each region of the first and second regions a material-securing location at which the terminal end of a corresponding first or second windable material is securable, and the item is adapted to be rotated in one direction about the longitudinal axis of the elongated core during a material unwinding process, the lanyard assembly is a first lanyard assembly, the cord portion of the first lanyard assembly is a first cord portion, the connector of the first lanyard assembly is a first connector and wherein the free end of the cord portion of the first lanyard assembly is securable to the material-securing location of the first region so that the first windable material can be secured to the material-securing location of the first region by way of the first lanyard assembly, and wherein the assembly further includes a second lanyard assembly including a second cord portion and a second connector which is connected to the second cord portion, and wherein the second connector includes an elongated connector body having two opposite ends and having a hollow interior including an end opening which opens out of the elongated connector body of the second lanyard assembly at one of the two opposite ends thereof and into which the terminal end of the second windable material can be inserted for purposes of anchoring the terminal end of the second windable material to the connector body of the second lanyard assembly, and the second cord portion of the second lanyard assembly has a free end opposite the second elongated body which is securable to the material-securing location of the second region so that the second windable material is securable to the material-securing location of the second region by way of the second lanyard assembly.

5. The assembly as defined in claim 4 wherein each of the first and second lanyard assemblies has an overall length, and the overall lengths of the first and second cord portions are different from one another.

6. The assembly as defined in claim 5 wherein a difference in length between the overall lengths of the first and second lanyard assemblies is within a range of between about three inches and twelve inches.

7. The assembly as defined in claim 4 wherein the material-securing location of the second region of the first and second regions is circumferentially spaced about the outer surface of the elongated core from the material-securing location of the first region by a predetermined distance and in a circumferential direction from a path traced axially along the core and which includes the material-securing location of the first region and which circumferential direction is opposite the one direction in which the item is rotated during a wire unwinding process.

8. The assembly as defined in claim 7 wherein the predetermined distance is within a range of between about three inches and twelve inches.

9. An anchoring system for use with an item for holding a wire or cable having a terminal end; wherein the item includes an elongated core having a longitudinal axis and defining an outer surface about which the wire or cable can be wound or from which the wire or cable can be unwound, and there is associated with the outer surface a securement location at which the terminal end of the wire or cable is adapted to be secured; the system comprising:

a lanyard assembly including a cord portion having two opposite ends and a wire-accepting connector connected to the cord portion adjacent one end of the two opposite ends of the cord portion, the other end of the two opposite ends of the cord portion being a free end which is securable to the elongated core adjacent the securement location thereof and wherein the connector includes an elongated connector body having two opposite ends and having a hollow interior including an end opening which opens out of the elongated connector body at one of the two opposite ends of the elongated connector body and into which the terminal end of the wire or cable can be inserted for purposes of anchoring the terminal end of the wire or cable to the connector body;

so that by securing the free end of the cord portion to the outer surface of the elongated core as aforesaid and anchoring the terminal end of the wire or cable to the connector body after inserting the terminal end of the wire or cable into the end opening of the connector body, the lanyard assembly is disposed between the elongated core and the wire or cable as a path is traced between the outer surface of the elongated core and the wire or cable and along the lanyard assembly, and the wire or cable is anchored to the elongated core by way of the lanyard assembly for an operation involving winding of the wire or cable about the elongated core; the hollow interior of the connector body defines interior surfaces and the terminal end of the wire or cable defines an exterior surface, and the connector body has a plurality of projections disposed across the interior surfaces of the hollow interior prior to insertion of the terminal end of the wire or cable into the hollow interior and wherein the plurality of projections face inwardly of the hollow interior so that when the connector body is subsequently crimped about the inserted wire or cable, the interior surfaces of the hollow interior are mashed against the exterior surface of the wire or cable so that the projections bite into the wire or cable; and wherein the hollow interior of the connector body defines interior surfaces and the terminal end of the wire or cable defines an exterior surface, and the connector body has a plurality of projections disposed across the interior surfaces of the hollow interior prior to insertion of the terminal end of the wire or cable into the hollow interior and wherein the plurality of projections face inwardly of the hollow interior so that when the connector body is subsequently crimped about the inserted wire or cable, the interior surfaces of the hollow interior are mashed against the exterior surface of the wire or cable so that the projections bite into the wire or cable.

10. The system as defined in claim 9 wherein the connector body includes a window which extends from the hollow interior of the connector body and opens out of the exterior surface thereof and through which a user can visually determine whether the terminal end of the wire or cable has been inserted endwise into the hollow interior of the connector body by a predetermined amount.

11. The system as defined in claim 9 wherein the connector body is releasably securable to the wire or cable to accommodate, when desired, a quick release of the wire or cable from the connector body.

12. The system as defined in claim 9 wherein the elongated core of the item has first and second ends, and the outer surface of the elongated core has first and second regions disposed axially along the elongated core between the first and second ends and about which a first wire or cable and a second wire or cable can be wound or from which the first wire or cable and the second wire or cable can be unwound, and wherein there is associated with each region of the first and second regions a material-securing location at which the terminal end of a corresponding wire or cable is securable, and the item is adapted to be rotated in one direction about the longitudinal axis of the elongated core during a wire or cable unwinding process, the lanyard assembly is a first lanyard assembly, the cord portion of the first lanyard assembly is a first cord portion, the connector of the first lanyard assembly is a first connector and wherein the free end of the cord portion of the first lanyard assembly is securable to the material-securing location of the first region so that the first wire or cable can be secured to the material-securing location of the first region by way of the first lanyard assembly, and wherein the system further includes:

a second lanyard assembly including a second cord portion and a second wire-accepting connector connected to the second cord portion, wherein the second connector includes an elongated connector body having two opposite ends and having a hollow interior including an end opening which opens out of the elongated connector body of the second lanyard assembly at one of the two opposite ends thereof and into which the terminal end of the second windable material can be inserted for purposes of anchoring the terminal end of the second wire or cable to the connector body of the second lanyard assembly, and the second cord portion of the second lanyard assembly has a free end opposite the second elongated body which is securable to the material-securing location of the second region so that the second wire or cable is securable to the material-securing location of the second region by way of the second lanyard assembly; and the connector body of at least one of the first and second lanyard assemblies is adapted to be crimped about the terminal end of the wire or cable when the terminal end of the wire or cable is inserted into the hollow interior of the connector body to thereby anchor the wire or cable to the connector body.

13. The system as defined in claim 12 wherein each of the first and second lanyard assemblies has an overall length, and the overall lengths of the first and second lanyard assemblies are different from one another.

14. The system as defined in claim 13 wherein a difference in length between the overall lengths of the first and second lanyard assemblies is within a range of between about three inches and twelve inches.

15. The system as defined in claim 12 wherein the material-securing location of the second region of the first and second regions is circumferentially spaced about the outer surface of the elongated core from the material-securing location of the first region by a predetermined distance and in a circumferential direction from a path traced axially along the elongated core and which includes the securement location of the first region and which circumferential direction is opposite the one direction in which the item is rotated during a wire unwinding process.

16. In an item for holding two windable materials wherein each windable material has a terminal end and wherein the item includes an elongated core, first and second ends and defining an outer surface having at least two regions disposed axially along the elongated core between the first and second ends and about which a corresponding one of the windable materials can be wound or from which a corresponding one of the windable materials can be unwound, wherein there is associated with each region of the at least two regions a material-anchoring location at which the terminal end of a corresponding one of the two windable materials is anchorable, and the item is adapted to be rotated in one rotational direction about the longitudinal axis of the core during a material unwinding process, the improvement comprising:

a lanyard assembly associated with each of the two regions of the outer surface of the elongated core wherein each lanyard assembly includes a cord portion having two opposite ends and a connector connected to one of the two opposite ends of the cord portion to which a corresponding one of the two windable materials is securable, the connector of each lanyard assembly includes an elongated connector body having two opposite ends and having a hollow interior including an end opening which opens out of the body at one of the two opposite ends thereof and into which the terminal end of a corresponding one of the two windable materials can be inserted for purposes of anchoring the terminal end of the corresponding windable material to the connector body and the other of the two opposite ends of the cord portion of each lanyard assembly is a free end which is securable to the elongated core adjacent the material-anchoring location of a corresponding region so that by securing the free end of the cord portion to the elongated core as aforesaid and anchoring the terminal end of a corresponding windable material to the connector body after inserting the terminal end of a corresponding windable material into the end opening of the connector body, each lanyard assembly is disposed between the elongated core and the corresponding windable material as a path is traced from the outer surface of the elongated core and the corresponding windable material and along the lanyard assembly, and the corresponding windable material is anchored to the elongated core by way of the lanyard assembly for an operation involving the winding of the corresponding windable material about the elongated core; and wherein the connector body of at least one of the lanyard assemblies is adapted to be crimped about the terminal end of a corresponding windable material when the terminal end of the corresponding windable material is inserted into the hollow interior of the connector body to thereby anchor the corresponding windable material to the connector body.

17. The item as defined in claim 16 wherein each lanyard assembly associated with the two regions of the outer surface of the elongated core has an overall length and the overall lengths of the lanyard assemblies are different from one another.

18. The item as defined in claim 17 wherein a difference in length between the overall lengths of the lanyard assemblies is within a range of between about three inches and twelve inches.

19. An assembly for anchoring a windable material to an item including an elongated core about which the windable material can be wound or from which the windable material can be unwound, wherein the windable material includes a terminal end; the assembly comprising:

a lanyard assembly including a cord portion having two opposite ends and a connector connected to one of the two opposite ends of the cord portion to which the windable material is securable, the connector includes an elongated connector body having two opposite ends and having a hollow interior including an end opening which opens out of the body at one of the two opposite ends thereof and into which the terminal end of the windable material can be inserted for purposes of anchoring the terminal end of the windable material to the connector body; and the cord portion of the lanyard assembly has a free end opposite the connector body which is securable to the elongated core so that by securing the free end of the cord portion to the elongated core as aforesaid and anchoring the terminal end of the windable material to the connector body after inserting the terminal end of the windable material into the end opening of the elongated connector body, the lanyard assembly is disposed between the elongated core and the windable material as a path is traced between the elongated core and the windable material and along the lanyard assembly, and the windable material is anchored to the elongated core by way of the lanyard assembly for an operation involving the winding of the windable material about the elongated core and wherein the connector body is adapted to be crimped about the terminal end of the windable material when the terminal end is inserted into the hollow interior of the connector body to thereby anchor the windable material to the connector body.

20. An anchoring system for use with an item for holding a wire or cable having a terminal end; wherein the item includes an elongated core having a longitudinal axis and defining an outer surface about which the wire or cable can be wound or from which the wire or cable can be unwound, and there is associated with the outer surface a securement location at which the terminal end of the wire or cable is adapted to be secured; the system comprising:

a lanyard assembly including a cord portion having two opposite ends and a wire-accepting connector connected to the cord portion adjacent one end of the two opposite ends of the cord portion, the other end of the two opposite ends of the cord portion being a free end which is securable to the elongated core adjacent the securement location thereof and wherein the connector includes an elongated connector body having two opposite ends and having a hollow interior including an end opening which opens out of the elongated connector body at one of the two opposite ends of the elongated connector body and into which the terminal end of the wire or cable can be inserted for purposes of anchoring the terminal end of the wire or cable to the connector body;

so that by securing the free end of the cord portion to the outer surface of the elongated core as aforesaid and anchoring the terminal end of the wire or cable to the connector body after inserting the terminal end of the wire or cable into the end opening of the connector body, the lanyard assembly is disposed between the elongated core and the wire or cable as a path is traced between the outer surface of the elongated core and the wire or cable and along the lanyard assembly, and the wire or cable is anchored to the elongated core by way of the lanyard assembly for an operation involving winding of the wire or cable about the elongated core; and wherein the connector body is adapted to be crimped about the terminal end of the wire or cable when the terminal end is inserted into the hollow interior of the connector body to thereby anchor the wire or cable to the connector body.

21. The system as defined in claim 20 wherein the material-securing locations of the at least two regions are circumferentially spaced from one another about the elongated core by a predetermined distance.

\* \* \* \* \*